Sept. 1, 1970          H. DARDA          3,526,434

PRESSURE BREAKER

Original Filed June 21, 1967          6 Sheets-Sheet 1

Inventor:
HELMUT DARDA

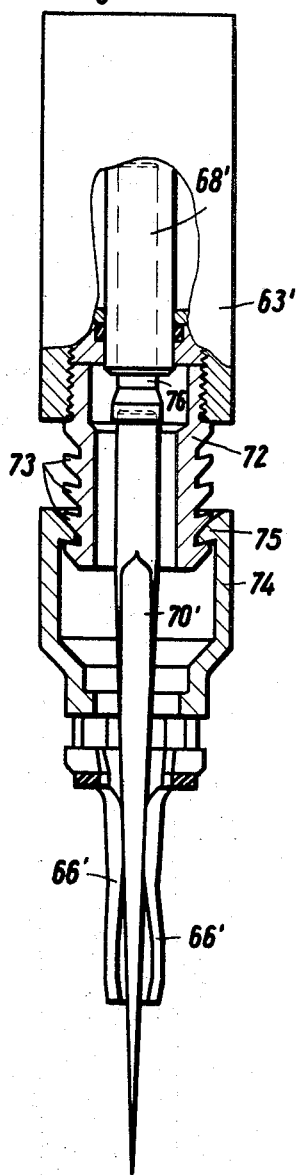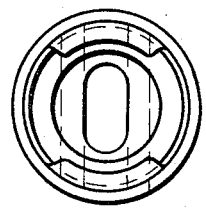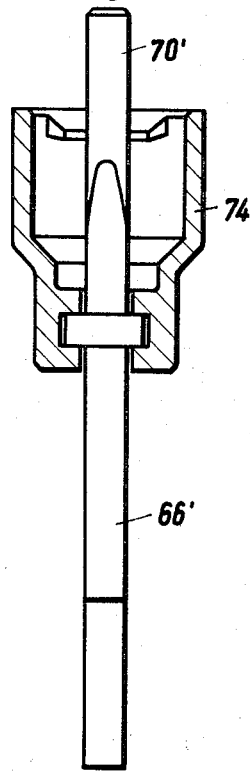

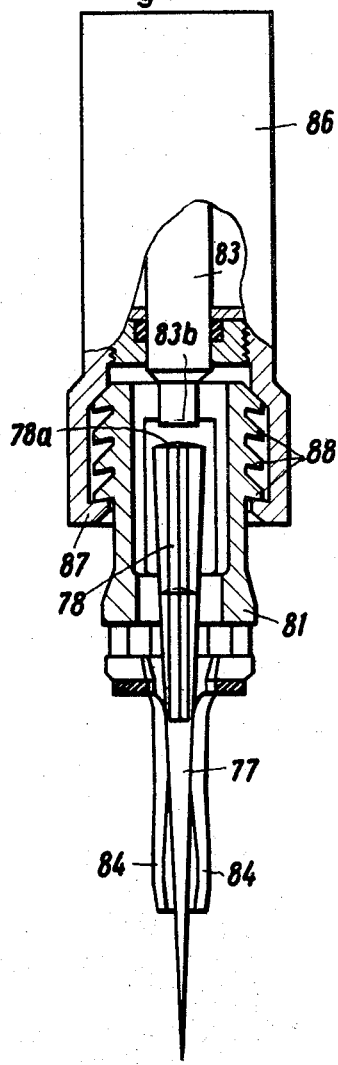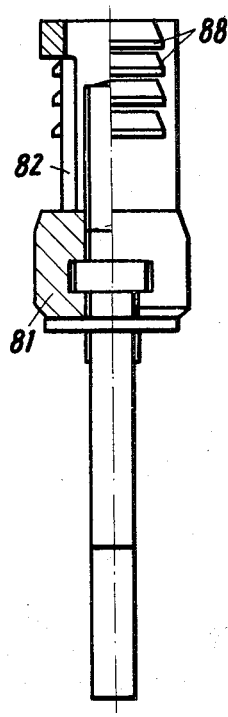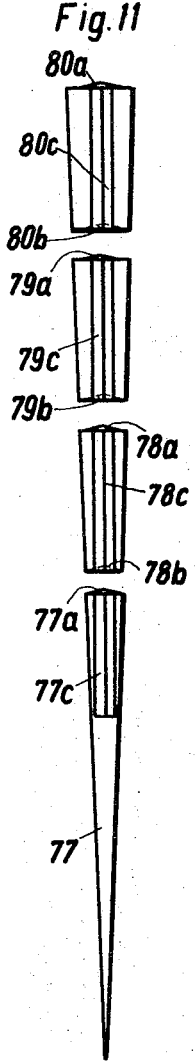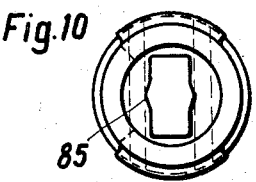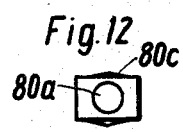

Sept. 1, 1970           H. DARDA           3,526,434
PRESSURE BREAKER
Original Filed June 21, 1967           6 Sheets-Sheet 4
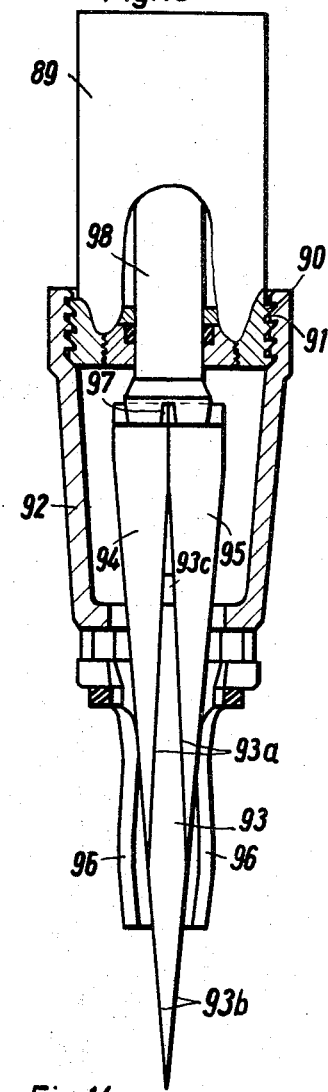
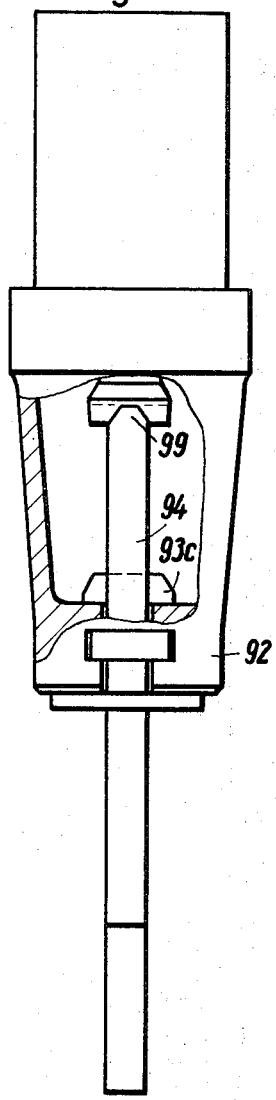
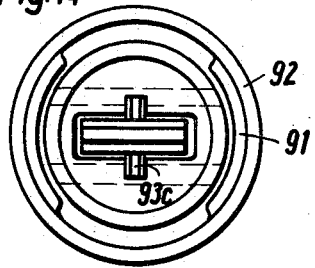
Inventor:
HELMUT DARDA

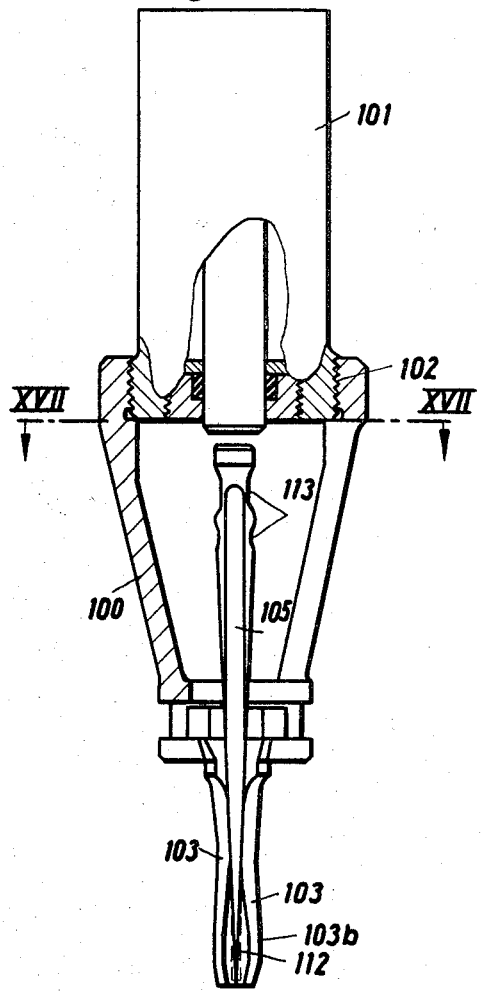
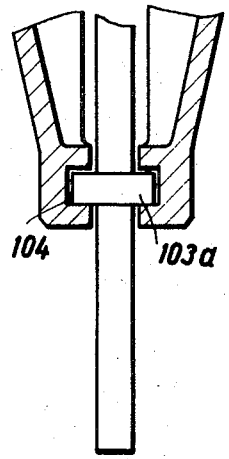
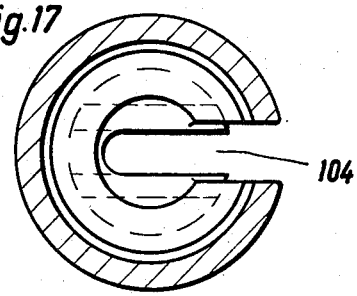

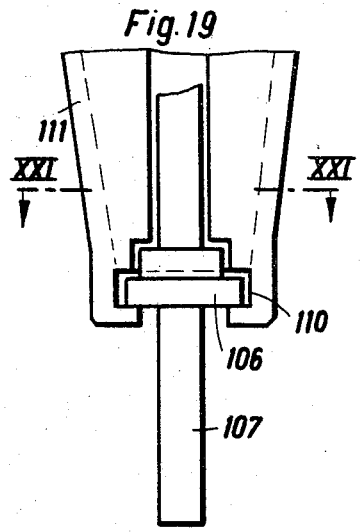
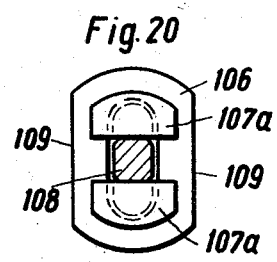
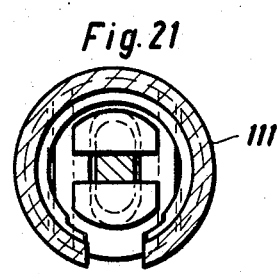
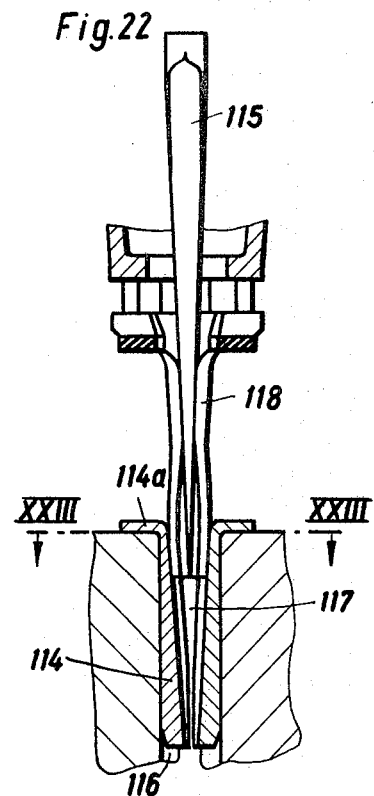
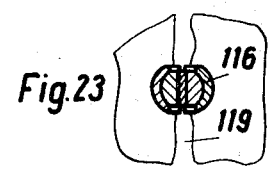
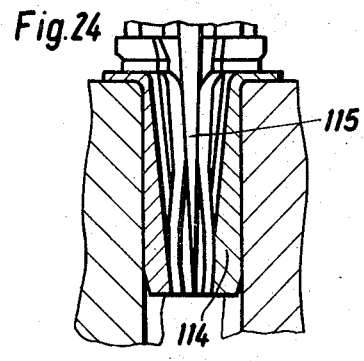

United States Patent Office 3,526,434
Patented Sept. 1, 1970

3,526,434
PRESSURE BREAKER
Helmut Darda, Nordwerk, Blumberg, Baden, Germany
Original application June 21, 1967, Ser. No. 648,537, now Patent No. 3,439,954, dated Apr. 22, 1969. Divided and this application Feb. 6, 1969, Ser. No. 797,022
Claims priority, application Germany, Dec. 8, 1966, D 51,738; Mar. 8, 1967, D 52,469
Int. Cl. E21c 37/02
U.S. Cl. 299—22                                28 Claims

ABSTRACT OF THE DISCLOSURE

A pressure breaker which comprises an elongated expander insertable into the drill hole of a rocky formation and coupled to the cylinder of a hydraulic operating means by a first connecting device, and a spreader received between the pressure bars of the expander and connected to the piston of the operating means by a second connecting device. At least one of the two connecting devices permits separation of the spreader or expander from the corresponding part of the operating means. When the spreader is caused to penetrate deeper into the expander, the pressure bars move apart and stress the material around the drill hole.

CROSS-REFERENCE TO RELATED APPLICATION

This invention relates to improvements in pressure breakers disclosed in my copending application Ser. No. 570,353, filed on Aug. 4, 1966 for Hydraulically Actuated Tool for the Mechanical Crushing of Rocks by Means of a Wedge Slidable Through Insert Pieces, and now Pat. No. 3,414,328, granted Dec. 3, 1968.

This application is a division of my copending application Ser. No. 648,537, filed June 21, 1967, now Pat. No. 3,439,954, granted Apr. 22, 1969.

BACKGROUND OF THE INVENTION

The present invention relates to improvements in fluid-operated tools, also called pressure breakers, which are utilized to crack rock or like formations.

It is already known to employ in quarries or mines hydraulically actuated tools which are insertable into drill holes to form cracks in large blocks of rock or ore. As a rule, the formation to be broken up is provided with a series of drill holes located in the plane in which the formation is to be cracked, and the operators drive into such holes suitable wedges to form a fissure. In accordance with a presently preferred procedure, drill holes receive pressure bars with a wedge-like spreader therebetween. When the spreader is moved lengthwise, it acts against the pressure bars and causes them to exert pressure against material which surrounds the drill hole. Such pressure breakers are disclosed, for example, in German Pat. No. 960,167 or in U.S. Pat. No. 2,385,753.

A serious drawback of presently known pressure breakers is that they cannot be inserted into drill holes of small diameter. The number of man hours and the wear upon drilling tools are directly proportional to the diameter of a drill hole, i.e., it is highly desirable to construct a pressure breaker in such a way that it can form cracks in a formation which is provided with one or more drill holes of small diameter.

In the pressure breaker of the aforementioned U.S. Pat. No. 2,385,753, a single wedge-like spreader is separated from the pressure bars by flanged roller bearings which occupy much room and prevent insertion of pressure bars into a small-diameter hole. Furthermore, and in order to successfully withstand stresses which arise when the spreader is shifted relative to the pressure bars, the bearings must be rather large and rugged which also contributes to bulkiness of such pressure breakers. Moreover, the bearings are rapidly damaged or destroyed by dust or other foreign matter which penetrates between the spreader and the pressure bars. It was found that such pressure breakers cannot be used in drill holes which are not absolutely straight. Since the drilling tools are normally held by hand, it happens again and again that the hole is not entirely straight.

My aforementioned copending application Ser. No. 570,353 discloses a hydraulically actuated pressure breaker which constitutes an improvement over the pressure breaker of U.S. Pat. No. 2,385,753. The improved pressure breaker need not utilize bearings between the pressure bars and the spreader. However, it was found that my pressure breaker requires certain modifications and improvements, for example, as regards its utilization in relatively long drill holes.

SUMMARY OF THE INVENTION

It is an important object of my invention to provide a novel and improved pressure breaker which can be inserted into straight drill holes or into drill holes which are not absolutely straight and which can be inserted into and successfully employed in very long drill holes of small diameter.

Another object of the invention is to provide a pressure breaker which can concentrate the cracking or expanding force in a desired section of the drill hole, which can exert simultaneous pressure against two or more longitudinally spaced portions of material which surrounds the drill hole, whose effective length may be varied at will and within a desired range, and which can be manipulated by persons having little technical skill.

A further object of the invention is to provide a pressure breaker which can exert substantial stresses against the material surrounding a drill hole as soon as its spreader or spreaders begin to move relative to the pressure bars.

A concomitant object of the invention is to provide a pressure breaker which can utilize spreaders which are much longer than the spreaders of presently known pressure breakers but without necessitating the drilling of large-diameter holes.

A further object of the invention is to provide novel inserts which can be used with heretofore known spreaders to effect further propagation of partial cracks or to form cracks in formations wherein a conventional pressure breaker cannot do the work.

Another object of my invention is to provide a pressure breaker wherein one or more parts can be conveniently and rapidly detached or reapplied without resorting to any tools or by resorting to readily available tools, and wherein individual parts can be replaced without necessitating even partial dismantling of the remaining parts.

One feature of my invention resides in the provision of a pressure breaker which can be used to form cracks in rocky or like formations which are provided with drill holes. The pressure breaker comprises an operating unit including a fluid-actuated cylinder assembly and a piston assembly reciprocably received in the cylinder assembly, elongated expander means receivable in a drill hole and including pressure bars having portions movable toward and away from each other transversely of the drill hole, substantially wedge-like spreader means received between the pressure bars and displaceable by the piston assembly to move the pressure bars apart whereby the bars stress the material around the drill hole, a first connecting device between the cylinder assembly and the expander means, and a second connecting device between the piston assembly and the spreader means. At least one of these connecting devices includes separable portions to allow for disengagement of the respective (expander or spreader) means from the corresponding (cylinder or piston) assembly.

The novel features which are considered as characteristic of the invention are set forth in particular in the appended claims. The improved pressure breaker itself, however, both as to its construction and the mode of assembling and operating the same, together with additional features and advantages thereof, will be best understood upon perusal of the following detailed description of certain specific embodiments with reference to the accompanying drawing.

BRIEF DESCRIPTION OF THE DRAWING

FIG. 5 is a partly elevational and partly sectional view of a second pressure breaker which constitutes a modification of the tool shown in FIG. 1;

FIG. 6 is a top plan view of an extension forming part of a connecting device between the pressure bars and the cylinder of the pressure breaker shown in FIG. 5;

FIG. 7 is an axial sectional view of the lower portion of the pressure breaker but taken in a plane which is normal to the plane of FIG. 5;

FIG. 8 is a partly elevational and partly axial sectional view of a third pressure breaker wherein the operating means comprises a one-piece cylinder;

FIG. 9 is a partly elevational and partly axial sectional view of the structure shown in the lower part of FIG. 8 but turned through 90°;

FIG. 10 is a top plan view of the structure shown in FIG. 9;

FIG. 11 is an exploded side elevational view of a composite spreader which can be used in the tool of FIG. 8;

FIG. 12 is a top plan view of the spreader shown in FIG. 11;

FIG. 13 is a partly elevational and partly axial sectional view of a fourth pressure breaker which can utilize a differently constructed composite spreader;

FIG. 14 is a top plan view of the tool shown in FIG. 13 but with the operating means omitted;

FIG. 15 is a view as seen from the left-hand side of FIG. 13 but with portions of the pressure breaker broken away;

FIG. 16 is a partly elevational and partly axial sectional view of a fifth pressure breaker;

FIG. 17 is a transverse sectional view as seen in the direction of arrows from the line XVII—XVII of FIG. 16;

FIG. 18 is a sectional view of the lower part of the tool shown in FIG. 16 but turned through 90°;

FIG. 19 is a fragmentary side elevational view of a pressure breaker which constitutes a modification of the tool shown in FIGS. 16–18;

FIG. 20 is a top plan view of the expander in the pressure breaker of FIG. 19;

FIG. 21 is a transverse sectional view as seen in the direction of arrows from the line XXI—XXI of FIG. 19;

FIG. 22 is a fragmentary sectional view through a rocky formation wherein a drill hole receives specially configured inserts which permit cracking of the formation by means of my pressure breaker;

FIG. 23 is a transverse sectional view as seen in the direction of arrows from the line XXIII—XXIII of FIG. 22; and FIG. 24 is a view similar to that of FIG. 22 but showing the pressure bars in fully inserted positions.

DESCRIPTION OF THE PREFERRED EMBODIMENTS

In each of the embodiments shown in FIGS. 1 to 21, the expander is detachably connected with the cylinder unit of the operating means or the spreader is detachably connected with the piston unit of the operating means.

Figure 4:
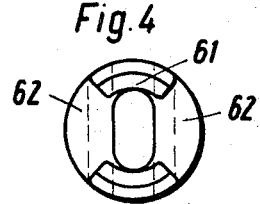
FIG. 4 is a top plan view of the structure shown in FIG. 3.

Referring first to FIGS. 1 to 4, there is shown a pressure breaker which comprises a cylinder unit composed of a block 63 which receives a reciprocable piston (not shown) having a piston rod 68, and an adapter 64 which is threadedly connected with the cylinder block 63. The adapter 64 constitutes one portion of the connecting device which secures an expander having pressure bars 66 to the cylinder block 63. Another portion of the connecting device comprises an extension 60 having external projections in the form of jaws or teeth 61 which can engage with two inwardly extending projections or teeth 65 provided at the lower end of the adapter 64. As shown in FIG. 4, the extension 60 is formed with two axially extending clearances or gaps 62 which separate the two groups of teeth 61 from each other. The teeth 61 are disposed in pairs at different axial distances from the pressure bars 66. In order to attach the pressure bars 66 to the cylinder block 63, the operator introduces the teeth 65 of the adapter 64 into the gaps 62 of the extension 60, and the extension is then rotated with reference to the block 63 in order to place a selected pair of its teeth 61 into engagement with the teeth 65 of the adapter 64. Each tooth 61 preferably extends through an angle of 90° (see FIG. 4). The pressure bars 66 have heads 67 (shown in FIG. 3) which are receivable in sockets provided therefor in the extension 60. The sockets for the heads 67 resemble T-shaped grooves. By placing the teeth 65 of the adapted 64 into engagement with a selected pair of teeth 61 on the extension 60, the operator can increase or reduce the distance between the upper end of the cylinder block 63 and the pressure bars 66. An elastic retaining ring 69 surrounds the pressure bars 66 directly below the extension 60 so as to hold their heads 67 in the respective sockets.

Figure 1:
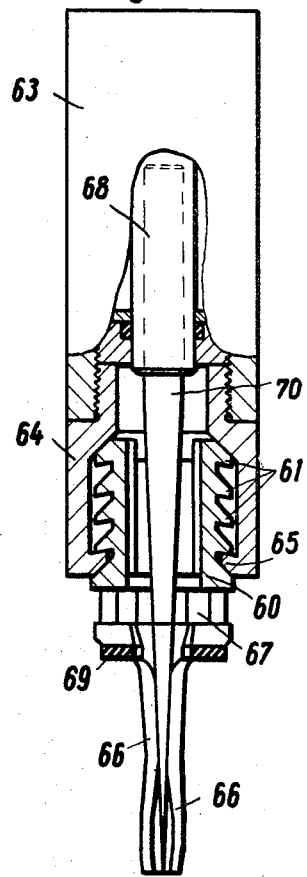
FIG. 1 is a partly elevational and partly sectional view of a first pressure breaker wherein the combined length of the cylinder and expander can be varied and wherein the spreader and the pressure bars of the expander means are readily separable from the operating means.
Figure 2:
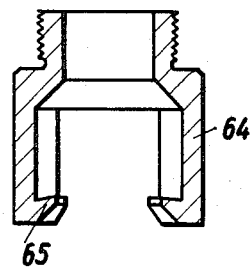
FIG. 2 is an axial sectional view of a portion of the cylinder in the pressure breaker of FIG. 1.
Figure 3:
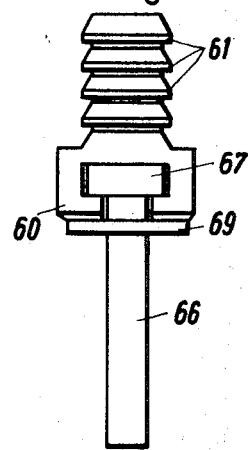
FIG. 3 is a side elevational view of pressure bars and of an extension which forms part of a connecting device between the expander and the cylinder of the operating means.

The wedge-like spreader 70 has an upper end portion which is insertable into a blind bore provided in the lower end of the piston rod 68. This blind bore communicates with a radial slot through which the upper end portion of the spreader 70 can be inserted or withdrawn when the piston rod is moved to its lower end position. It is to be noted that FIG. 1 illustrates the piston rod 68 in its upper end position. The spreader 70 is provided with at least one pair of external surfaces which taper downwardly and away from the cylinder block 63 and are received between complementary internal surfaces of the pressure bars 66 so that these bars move apart when the piston performs a downward stroke.

The pressure breaker of FIGS. 1 to 4 can be operated in the following way:

The heads 67 of the pressure bars 66 are inserted into the corresponding sockets of the extension 60. In the next step, the pressure bars 66 are introduced into a drill hole formed in a rocky or like formation which is to be cracked by the pressure breaker. The diameter of the drill hole is such that it receives the pressure bars 66 with minimal clearance. The spreader 70 is inserted between the pressure bars 66 but is held in the starting position shown in FIG. 1. The cylinder block 63 is then connected with the extension 60 by placing the teeth 65 of the adapter 64 into registry with the gaps 62 and the block 63 is moved downwardly, as viewed in FIG. 1, until the top face of the spreader 70 abuts against the bottom surface in the blind bore of the piston rod 68. The block 63 is then rotated with reference to the extension 60 whereby the teeth 65 enter into the spaces between the adjoining teeth 61 so as to establish a separable connection between the cylinder block and the extension. On admission of a hydraulic pressure medium into the upper chamber of the cylinder block 63, the piston causes the piston rod 68 to move downwardly and to force the spreader 70 into the space between the pressure bars 66 whereby these bars move apart and stress the material around the drill hole. Since the pressure bars 66 are received in the drill hole with minimal clearance, the expansion or cracking of the formation begins as soon as the spreader 70 starts to move downwardly.

FIGS. 5 to 7 illustrate a modification of the pressure breaker shown in FIG. 1. The cylinder block 63' is connected with an adapter 72 having pairs of external projections or teeth 73 which can be placed into engagement with inwardly extending projections or teeth 75 provided on an extension 74 which carries two pressure bars 66'. The heads of pressure bars 66' are received in sockets provided therefor in the extension 74. The spreader is shown at 70'. This spreader can be connected with the piston rod 68' in the same way as described in connection with FIGS. 1 to 4.

FIG. 5 further illustrates the manner in which the spreader 70' can be moved through distances of desired length. In this embodiment of my invention, the blind bore of the piston rod 68' can receive a pin 76 whose lower end is formed with a shallow recess to receive the upper end portion of the spreader 70'. The pin 76 can be inserted upon completion of a downward stroke by the piston rod 68' and upon subsequent retraction of the piston rod to the position shown in FIG. 5. When the piston rod 68' is thereupon caused to perform a downward stroke, the pin 76 drives the spreader 70' deeper between the pressure bars 66' to effect further deformation of the expander. The pin 76 is employed whenever the deformation of bars 66' in response to a downward stroke of the piston rod 68' does not suffice to crack the formation. It is clear that the pin 76 can be replaced by a pin of greater or lesser length or that the operator can employ a succession of such pins. For example, once the pin 76 has been advanced into the interior of the adapter 72, and assuming that the formation is still intact, the operator will return the piston rod 68' to its upper end position and will employ a second pin similar to or longer or shorter than the pin 76. The parts 70', 76 form two sections of a composite spreader.

FIGS. 8 to 12 illustrate a further modification of the pressure breaker shown in FIGS. 1 to 4. This pressure breaker also utilizes a composite spreader which is assembled of a series of portions or sections arranged end-to-end and clearly shown in FIG. 11. For example, the spreader may comprise a total of four sections 77, 78, 79, 80. An extension 81 is provided with a window 82 through which successive sections of the spreader can be introduced and coupled to each other as well as to the piston rod 83. The piston rod 83 is reciprocable with its piston in a cylinder block 86. In this embodiment of my invention, the connecting device between the piston block 86 and the pressure bars 84 of the expander comprises the aforementioned extension 81 and the lower portion of the block 86. The extension 81 has several pairs of external projections or teeth 88 which can engage with inwardly extending projections or teeth 87 at the lower end of the cylinder block 86 substantially in the same way as described in connection with FIGS. 1 to 7.

Each section of the spreader tapers in the same direction so that the transverse dimensions of the composite spreader increase in response to addition of one or more sections to the first section 77. This is clearly shown in FIG. 11. Consequently, when the spreader is driven into the space between the pressure bars 84, these pressure bars are caused to move apart and to exert a requisite pressure against the material of the formation which surrounds the drill hole. In order to insure that the sections of the spreader will remain connected to each other in response to or subsequent to cracking of the formation, their ends 77a, 78a, 79a and 80a are preferably made of magnetic material. In other words, the abutting ends of the sections of the spreader are caused to stick to each other even if no pressure is exerted against the rearmost section 80. Furthermore, and as shown in FIGS. 11 and 12, the larger-diameter end of each section is preferably provided with a relatively short pyramidal or conical protuberance which enters a shallow depression or recess 78b, 79b, 80b of the adjoining section. The piston rod 83 is also provided with a depression 83b which can receive the protuberance at the upper end 80a of the section 80.

The sections of the spreader are further provided with laterally extending guide cams 77c to 80c which can slide in channels 85 provided in the bottom wall of the extension 81.

It will be noted that the teeth 87 shown in FIG. 8 are integral with the cylinder block 86, i.e. that the adapter 64 of FIG. 1 has been dispensed with. The teeth 87 can engage a selected pair of external teeth 88 on the extension 81.

FIGS. 13 to 15 illustrate a further pressure breaker which comprises a cylinder block 89 having external teeth 90 meshing with internal teeth 91 at the upper end of an extension 92 which carries two pressure bars 96. If desired, the projections 90, 91 can be replaced by threads provided on the cylinder block 89 and extension 92 to engage in the same way as described in connection with the preceding illustrations. The connecting device which includes the teeth 90, 91 resembles a bayonet lock.

The spreader of the pressure breaker shown in FIGS. 13 to 15 comprises two sections including a leading section 93 which is first to be driven into the space between the pressure bars 96 and is bounded by external surfaces 93b which taper away from the cylinder block 89. The second section of the spreader comprises two wedge-like parts 94, 95 each of which can be detachably secured to the piston rod 98. The latter has a transversely extending cutout 97 which can receive a head 93c provided on the section 93. Once the section 93 is driven into the space between the pressure bars 96, the piston rod 98 can be withdrawn and is then connected with the parts 94, 95 which are formed with internal surfaces tapering in the same way as the external surfaces 93a of the section 93. Thus, when the piston rod 98 performs the next working stroke, the parts 94, 95 wedge themselves into the spaces between the surfaces 93a and the pressure bars 96 to bring about further separation of pressure bars and to insure that the formation will crack. As shown in FIG. 15, the lower end portion of the piston rod 98 is provided with a second transverse slot which receives the upper end portions 99 of the parts 94, 95. The second slot of the piston rod 98 preferably extends at right angles to the cutout 97. When the parts 94, 95 are caused to penetrate into the space between the pressure bars 96, the head 93c of the section 93 bears against the bottom wall of the extension 92. Therefore, the internal surfaces of the parts 94, 95 then slide along the external surfaces 93a of the section 93 and cause further expansion of the pressure bars 96.

FIGS. 16 to 18 illustrate a simplified construction of the pressure breaker which was described in connection with FIGS. 13 to 15. This tool comprises a cylinder block 101 which is connected with an extension 100 by means of threads 102. The pressure bars of the expander are shown at 103 and the spreader is shown at 105. The lower end portion of the extension 100 is provided with a transverse slot 104 which can receive the heads 103a of the pressure bars 103. Thus, when the pressure bars 103 are inserted into a drill hole and the spreader 105 is driven between the pressure bars, the extension 100 can be readily detached by moving it transversely of the pressure bars 103 so that the cylinder block 101 and its piston rod can be utilized to drive a second spreader between a second pair of pressure bars 103 which are inserted into another drill hole. The upper end of the spreader 105 need not be positively connected with the piston rod which latter is reciprocable in the cylinder block 101.

FIGS. 19 to 21 illustrate one mode of insuring that the pressure bars remain coupled to each other even if they are separated from the extension of the connecting device which secures them to the cylinder block. These illustrations show a ring 106 which is suspended in the extension 111. The ring 106 has a central slot (see FIG. 20) which receives the heads 107a of pressure bars 107 in such a way that the heads 107a overlie the top face of the ring 106. The wedge-like spreader 108 is received between the pressure bars 107. The ring 106 is provided with two facets 109 which are located diametrically opposite each other so that this ring can be non-rotatably inserted into a transversely extending groove 110 of the extension 111. The cylinder block which is coupled with the extension 111 is not shown in FIGS. 19 to 21.

Referring again to FIG. 16, for example, the numeral 112 denotes wear-resistant layers or coats provided on the internal surfaces of the pressure bars 103. Such layers are applied in the reinforced lower end portion 103b of the expander which includes the pressure bars 103. The layers 112 prevent excessive wear on the reinforced end portion 103b in response to reciprocation of the spreader 105.

FIG. 16 further shows that the upper end portion of the spreader 105 is provided with relatively shallow cutouts 113. This enhances the elasticity of the spreader in the region which is most likely to break.

Referring finally to FIGS. 22 to 24, there is shown a further embodiment of my invention. The numerals 114 denote tapering inserts which can be introduced into a drill hole 116 and have outwardly extending projections or lugs 114a which overlie the surface at the outer end of the drill hole 116. The inserts 114 are utilized in connection with the pressure breakers of FIGS. 1–21 or with conventional pressure breakers. In many conventional breakers, the length of the spreader 115 cannot be increased and, in order to achieve further expansion, the inserts 114 are placed into the hole 116 ahead of the pressure bars 118. When the spreader 115 is thereupon caused to move downwardly, it acts upon the pressure bars 118 which in turn act upon the tapering internal surfaces of the inserts 114 so that the inserts stress the material around the hole 116 and cause the formation of a crack. Each insert 114 is preferably bounded by a substantially semicircular external surface, see FIG. 23. The crack is shown at 119. The numeral 117 denotes in FIG. 22 a space whose cross-sectional area decreases in downward direction and which is defined by the inserts 114 to receive the pressure bars. FIG. 24 illustrates the spreader 115 in its upper end position. When the spreader is thereupon caused to move downwardly, it is normally sufficient to shift it through a relatively short distance in order to insure that the inserts 114 will form a crack 119 of requisite width so that the formation in which the bore hole 116 is formed is split.

The pressure breakers of FIGS. 1 to 24 can be utilized in connection with drill holes of different diameters. For example, and referring again to FIGS. 1–4, the pressure bars 66 can be readily detached from the extension 60 for replacement by differently dimensioned pressure bars which can be fitted with a minimum of clearance into a drill hole of larger or smaller diameter. The same holes true for the one-piece spreader 70 which can be readily separated from the piston rod 68. The axial distance between the extension 60 and the upper end of the cylinder block 63 will be varied in order to utilize only a portion of or the entire working stroke of the piston. Furthermore, the pressure breakers of FIGS. 1–24 can be furnished with several sets of pressure bars and spreaders which are detachable from the operating means. For example, and referring again to FIGS. 1 to 4, the pressure bars 66 can be inserted into a first drill hole prior to movement of the spreader 70 in downward direction, as viewed in FIG. 1, whereby the pressure bars stress the material around the drill hole. If the material fails to crack, the spreader 70 is detached from the piston rod 68 and the extension 60 is detached from the heads 67 of the pressure bars 66 which remain in the drill hole and continue to stress the surrounding formation. The operating means including the parts 63, 64, 68 is then used to drive a second spreader 70 between two pressure bars 66 which are inserted into the next drill hole, and so forth until the formation develops a crack. Axial adjustability of the extension 60 with reference to the adapter 64 insures that the pressure breaker can be assembled in such a way that the spreader 70 will begin to deform the pressure bars 66 as soon as it leaves its starting or retracted position. Once the axial position of the extension 60 is properly selected for use with a certain size of pressure bars and spreaders, the operating means can be detached from the attached to successive pressure bars and spreaders without necessitating further adjustments of the extension.

Composite spreaders of the type shown in FIGS. 5–15 will be utilized if the full working stroke of the piston rod does not suffice to crack a block of stone or the like. As shown, all sections of a composite spreader may but need not resemble wedges. For example, the section or pin 76 of FIG. 5 can resemble a cylinder. The principle underlying the operation of the pressure breaker shown in FIG. 13 is different from that of pressure breakers which are illustrated in FIGS. 5 and 8. Thus, the parts 94, 95 are not caused to bear against the outer end of the first section 93 but are driven between this section 93 and the pressure bars in order to insure that the tip of the section 93 need not be advanced beyond the position in which the head 93c engages with the bottom wall of the extension 92. The function of inserts 114 in FIGS. 22–24 is analogous to that of the parts 94, 95, i.e., these inserts are not placed end-to-end with the spreader 115 but surround a portion of the spreader. However, instead of being introduced into the space between the spreader 115 and the pressure bars 118, the inserts 114 are placed between the pressure bars and the surface surrounding the drill hole 116. The pressure bars 118 are preferably provided with external surfaces of semicircular outline which can be fitted into the space 117 between the inserts 114 with a minimum of clearance (see FIG. 23).

In order to further prevent breakage, the lower end portion of each spreader can be made of a material which is harder than the material in the remainder of the spreader. For example, the harder portion can extend along substantially one-fourth of the spreader. Thus, that part of each spreader which is connected with the operating means can be more elastic than the free end portion of the spreader.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

What is claimed is:

1. A pressure breaker, particularly for cracking of rocky or like formations which are provided with drill holes, comprising an operating unit including a fluid-actuated cylinder assembly comprising a cylinder block and a piston assembly reciprocably received in said cylinder block; elongated expander means receivable in a drill hole and including pressure bars having portions movable toward and away from each other transversely of the drill hole; substantially wedge-like spreader means received between said pressure bars and displaceable by said piston assembly to move said pressure bars apart whereby the bars stress the material around the drill hole; a first connecting device between said cylinder assembly and said expander means and including a one-piece extension carrying said expander means, and means for releasably connecting said extension with said expander means carried thereby as a unit to said cylinder assembly; and a second connecting device between said piston assembly and said spreader means.

2. A pressure breaker as defined in claim 1, wherein said extension and said cylinder block can be secured to each other in a plurality of positions in each of which said extension is located at a different distance from the other end of said cylinder block.

3. A pressure breaker as defined in claim 2, wherein said cylinder block comprises an adapter having projections separably engaging with projections provided on said extension.

4. A pressure breaker as defined in claim 3, wherein said projections are separable from each other in response to angular displacement of said extension with reference to said adapter or vice versa.

5. A pressure breaker as defined in claim 2, wherein said cylinder block has at least one pair of projections separated from each other by gaps and said extension has at least one pair of complementary projections engaging with said first-mentioned projections, said extension being separable from said block upon turning thereof to place its projections into registry with said gaps.

6. A pressure breaker as defined in claim 2, wherein said cylinder block has a plurality of axially spaced sets of teeth and said extension comprises a group of teeth engageable with a selected set of teeth in response to angular displacement of said extension.

7. A pressure breaker as defined in claim 1, wherein said first connecting device comprises portions which engage each other in bayonet lock fashion.

8. A pressure breaker as defined in claim 1, wherein said extension is provided with transverse slot means, said pressure bars having heads receivable in said slot means.

9. A pressure breaker as defined in claim 8, wherein said slot means is formed by a T-shaped groove.

10. A pressure breaker as defined in claim 8, wherein said slot means is dimensioned to permit insertion of said spreader means into the registry with said piston assembly.

11. A pressure breaker as defined in claim 1, wherein said extension has a transverse groove and a ring received in said groove, said pressure bars having heads which are suspended in said ring.

12. A pressure breaker as defined in claim 1, wherein said pressure bars have end portions separably mounted in said extension and said expander means further comprising resilient retaining means for preventing separation of said end portions from said extension.

13. A pressure breaker as defined in claim 1, wherein said second connecting device comprises a piston rod forming part of said piston assembly and having a recess separably receiving an end portion of said spreader means.

14. A pressure breaker as defined in claim 13, wherein said spreader means comprises a plurality of separable sections.

15. A pressure breaker as defined in claim 14, wherein said spreader means comprises at least two wedge-like sections.

16. A pressure breaker as defined in claim 14, wherein said sections consist at least in part of magnetic material.

17. A pressure breaker as defined in claim 14, wherein said sections can be placed end-to-end and comprise registering protuberances and recesses.

18. A pressure breaker as defined in claim 14, wherein said sections can be placed end-to-end and are provided with cams slidable in at least one guide groove of said first connecting device.

19. A pressure breaker as defined in claim 14, wherein said first connecting device is provided with a window to facilitate insertion and removal of said sections.

20. A pressure breaker as defined in claim 14, wherein said spreader means comprises a first section having a first group of external surfaces tapering away from said piston assembly and a second group of external surfaces tapering toward said piston assembly, said second connecting device having means detachably securing said first section to said piston assembly to move said pressure bars apart in response to the action of said first group of surfaces.

21. A pressure breaker as defined in claim 20, wherein said spreader means further comprises a second section connectable with said piston assembly upon disengagement of said first section, said second section including at least one part movable between at least one of said second group of surfaces and at least one of said pressure bars to move the pressure bars further apart in response to displacement of said part relative to said first section.

22. A pressure breaker as defined in claim 1, wherein said pressure bars have internal surfaces consisting at least partially of wear-resistant material to reduce wear in response to displacement of said spreader means.

23. A pressure breaker as defined in claim 1, wherein said spreader means comprises an end portion adapted to be coupled with said piston assembly and provided with at least one cutout to enhance the elasticity of said end portion.

24. A pressure breaker as defined in claim 1, wherein said spreader means comprises an end portion remote from said piston assembly and consisting of a material which is harder than the material of the remainder of said spreader means.

25. A pressure breaker as defined in claim 24, wherein said end portion takes up about one-fourth of the overall length of said spreader means.

26. A pressure breaker as defined in claim 1, further comprising at least one insert insertable into a drill hole outwardly of at least one of said pressure bars to transmit pressure to the material around the drill hole in response to movement of the spreader means relative to the pressure bars.

27. A pressure breaker as defined in claim 26, comprising a pair of substantially concavo-convex inserts defining between themselves a space which tapers away from the open end of the drill hole.

28. A pressure breaker as defined in claim 26 wherein said insert comprises a projection overlying the surface at the open end of the drill hole.

References Cited

UNITED STATES PATENTS

| | | | |
|---|---|---|---|
| 345,696 | 7/1886 | Hudson et al. | 299—22 |
| 2,093,452 | 9/1937 | Joy | 299—22 |

ERNEST R. PURSER, Primary Examiner